United States Patent [19]

Fondin

[11] Patent Number: 4,886,371
[45] Date of Patent: Dec. 12, 1989

[54] SENSOR FOR MEASURING THE INTERNAL TEMPERATURE OF A CENTRIFUGE CELL

[76] Inventor: Jean L. Fondin, 15, rue Guillaume Apollinaice, Saint Nazaire, France

[21] Appl. No.: 233,676

[22] Filed: Aug. 18, 1988

[30] Foreign Application Priority Data

Aug. 18, 1987 [FR] France ............................. 87 11674

[51] Int. Cl.$^4$ ...................... B04B 15/00; G01K 1/16; G01K 13/02
[52] U.S. Cl. .................................. 374/141; 374/165; 374/208; 414/10
[58] Field of Search ..................... 374/208, 163, 165, , 374/141; 494/10; 165/32

[56] References Cited

U.S. PATENT DOCUMENTS

| | | | |
|---|---|---|---|
| 2,343,242 | 3/1944 | Richmond | 374/208 X |
| 2,736,784 | 2/1956 | Gore | 374/163 X |
| 3,559,486 | 2/1971 | Gormar | 136/230 |
| 3,571,305 | 8/1973 | Huebscher | 136/242 X |
| 3,863,049 | 1/1975 | Himman | 494/10 X |
| 3,966,500 | 6/1976 | Brixy | 374/163 X |
| 4,153,372 | 5/1979 | Nanta | 366/142 |
| 4,622,851 | 11/1986 | Wilson | 374/208 X |

FOREIGN PATENT DOCUMENTS

1473254 12/1968 Fed. Rep. of Germany .
2235361 6/1974 France .

*Primary Examiner*—Daniel M. Yasich
*Attorney, Agent, or Firm*—Scully, Scott, Murphy & Presser

[57] ABSTRACT

A temperature sensor for measuring the internal temperature of a thermostatically controlled centrifuge cell. The sensor comprises a metallic element including a flange and a widened portion. The flange is adapted to be fixed in intimate contact against an area of an internal wall of the cell, in direct heat transfer relation with said internal wall; and the widened portion of the metallic element is spaced from the flange, includes a lateral surface having a surface area significantly larger than the area of contact between the flange and the internal wall of the cell, and is adapted to be positioned inside the centrifuge cell in heat transfer relation with the atmosphere therein. The metallic element forms an internal bore; and a temperature responsive prove is secured in that internal bore in heat transfer relation with the metallic element to sense, and to generate a signal indicative of, the temperature of the metallic body.

8 Claims, 1 Drawing Sheet

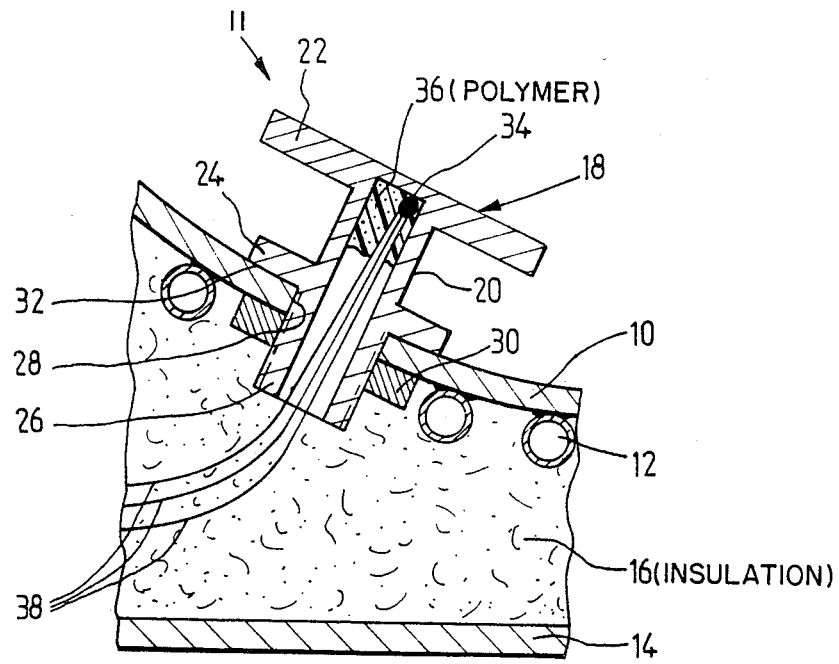

SENSOR FOR MEASURING THE INTERNAL TEMPERATURE OF A CENTRIFUGE CELL

A centrifuge generally consists of a metallic casing with double walls which are heat-insulated, comprising a cell of concave form and an external shielding. The base of the cell is sealingly traversed by a motor shaft which carries, at its internal end, a rotor on which there are articulated buckets intended to receive tubes or containers containing specimens of products to be centrifuged.

When at rest, the buckets hang downwards, while under the action of centrifugal force they place themselves in a horizontal plane. The rotation at high speed thus permits the speciment to undergo an acceleration amounting to up to several thousand times the acceleration due to gravity, and separation of the various components of the specimen by density difference.

For safety reasons, the cell of the centrifuge is kept closed by a door which is to a greater or lesser extent sealed. However, in these circumstances the energy released in the course of the rotation can only with difficulty be removed to the outside. When such centrifuges are used for the separation of biological specimens, which, as is known, do not tolerate excessive raising of the temperature, it is essential to regulate the temperature of the cell to a predetermined value which is generally of the order of 4° C.

The temperature regulation is carried out by means of a system which comprises a conventional refrigeration set, the freon evaporator of which consists of a coil which is intimately in contact with the wall of the cell, a temperature sensor located within the cell to obtain a local measurement point and an electronic regulation system which takes into account the reference temperature specified by the user and the actual temperature of the cell, and which generates a step or start command to the compressor of the refrigeration set, depending upon the value of the difference between these two temperatures.

Nevertheless, such a device poses several technical problems:

in the current state of the art, it is not possible to regulate the temperature of the specimens in the course of centrifuging. A temperature probe placed either on the surface of the cell or in the air does not permit a constant temperature to be ensured within the buckets on stopping and during the centrifuging.

the thermodynamic behavior of the system is dependent upon the speed regime of the rotor.

when the rotor is stopped (before or after the centrifuging), the thermodynamic model is entirely different from that which exists in the course of rotation.

the inertia of the transmission of the heat from the refrigerated wall of the cell to the specimens is very large. As a result of this, in the course of the phases which precede or which follow the centrifuging, there may take place a freezing of the specimens contained in the buckets, because the negative calories accumulated in the metal masses of the cell and of the shielding continue to be released. Thus, the temperature which is measured at an internal point of the cell or on the surface of the latter is no longer accurate when the conditions change. In other words, the temperature displayed by the regulating system is not representative of that which actually prevails in the buckets.

Moreover, the patent FRA 2,235,361 patented June 18, 1974 discloses a device of this type, but which measures only the temperature of the air which is in motion due to a fan. However, this indication is imprecise.

The object of the present invention is to remedy the aforementioned disadvantages, and to this end its subject is a temperature sensor which is defined in that it consists of a metallic element which comprises a flange intended to be fixed in intimate contact on the internal wall of the cell and a widened portion projecting within the cell and having a lateral surface which is significantly greater than the surface of contact between the flange and the cell, said part exhibiting a fluid bore within which there is accommodated a temperature probe maintained in contact with the wall of the metallic element.

According to a particular embodiment of the invention, the sensor is in the shape of a mushroom and comprises a tubular foot terminating at one end by said widened portion and at the other end by a threaded portion, above which an annular flange is formed, said threaded portion being introduced from the interior of the cell into a perforation of the latter and receiving, at its end, a nut intended to exert a powerful clamping of the flange against the wall of the cell.

The temperature probe is in contact with said widened portion and is embedded in a polymer which ensures the sealing in relation to the exterior and a good thermal contact with the widened wall.

The structure and the operation of the sensor according to the invention will be better understood on reading the description of an embodiment, with reference to the single accompanying figure, which represents a partial cross-sectional view of a centrifuge cell equipped with the sensor.

As centrifuges are well known in the art, the figure shows only the part of the centrifuge which is close to the sensor 11. It is possible to distinguish the metallic cell 10, refrigerated by a coil 12 in which the refrigerating fluid circulates, the shielding 14 and the thermally insulating material 16 which fills the space included between the cell and the shielding.

The sensor 11 comprises a monobloc metallic element 18 in the shape of a mushroom, which comprises a tubular foot 20 terminating at one end by a widened portion 22 in the shape of a disk. The metallic element 18 may have any other shape, the only condition to be satisfied being that the lateral surface of its widened part should be large, in order to promote an exchange of heat with the air contained in the cell. The bore of the foot 20 is closed on the side of the widened portion.

The foot is provided with an annular flange 24 and terminates beyond the flange by a threaded portion 26. The latter is engaged from the interior of the cell 10 in a perforation 28 formed in the cell and receives a nut 30 intended to clamp the lower face of the flange powerfully against the wall of the cell, in order to ensure an intimate contact between these two surfaces.

Within the sensor 11 there is accommodated a temperature probe 34 which is maintained in contact with the wall of the widened portion 22, or in thermal connection with said wall by means of a polymer 36 which ensures, at the same time, the sealing of the probe in relation to the external medium. The measuring wires 38 of the probe pass out through the opening of the threaded portion and are connected to a regulating device, not shown, which generates a signal commanding the stopping or the starting of the compressor of the refrigeration set. This signal is dependant upon the difference between the temperature detected by the probe and a reference temperature selected by the user.

A description will now be given of the principle of operation of the sensor 11. The temperature detected by the probe 34 results from two influences: the heat which is conveyed to it by conduction through the wall of the cell 10 and that which it receives by convection of the air situated within the cell.

When the rotating equipment of the centrifuge is stopped, it is the first influence which is preponderant. The measurement of the temperature is undertaken in a preferential manner on the wall of the cell 10, by virtue of the contact along the surface 32. The thermal inertia of the measurement on the cell is very low, so that the probe 34 is very rapidly brought to the temperature of the cell. This leads to the avoidance of an excessively great cooling of the cell during the stoppage phases, before or after the centrifuging, and the deteriorations which might result therefrom for the specimens.

During the rotation of the mobile equipment of the centrifuge, the linear velocity of the area in relation to the cell is very large (up to a few hundred meters per second). The lateral surfaces of the widened portion 22 and of the foot 20 of the sensor 11 rapidly reach an equilibrium temperature substantially equal to that of the air in the centrifuge. As said surface is very much larger than the surface of portion 22 and foot 20 32 which is in contact with the cell, the influence of the latter is secondary in relation to the first. The result of this is that the temperature measured is very close to the temperature of the air in the centrifuge. Likewise, the temperature of the buckets (not shown) of the centrifuge is substantially that of the air flow which bathes them. Thus, after a short interval of time, an equilibrium is reached between the temperature of the specimens contained in the buckets and that of the air. The temperature which is then measured by the sensor 11 represents a good approximation of that of the specimens in the course of centrifuging. The temperature regulation will therefore maintain the temperature of the specimens constant and equal to the reference value.

In summary, whether the rotary equipment of the centrifuge is stopped or in motion, the probe 34 rapidly places itself in equilibrium with the temperature of the surface, the influence of which is preponderant. This leads to the avoidance of an excessive lowering of the temperature of the specimens during the stoppage phases, before or after the centrifuging, by virtue of the measurement by conduction from the cell. This measurement permits the anticipation, over time, of transmission of the negative calories between the refrigeration coil and the temperature of the air. Furthermore, in the course of the centrifuging phases, a temperature of the specimens is obtained which is as close as possible to the reference value, by virtue of the measurement by convection.

It is self-evident that the invention is likewise applicable to thermostatically controlled centrifuges.

I claim:

1. A temperature sensor for measuring the internal temperature of a thermostatically controlled centrifuge cell, the sensor comprising:
    a metallic element including
        (i) a flange adapted to be fixed in intimate contact against an area of an internal wall of the cell, in direct heat transfer relation with said internal wall, and
        (ii) a widened portion spaced from said flange, including a lateral surface having a surface area significantly larger than the area of contact between the flange and the internal wall of the cell, and adapted to be positioned inside the centrifuge cell in heat transfer relation with the atmosphere therein,
    the metallic element forming an internal bore; and
    a temperature responsive probe secured in said internal bore in heat transfer relation with the metallic element to sense, and to generate a signal indicative of, the temperature of the metallic body.

2. A temperature sensor according to claim 1, wherein:
    the metallic element further includes a tubular foot having first and second ends and a threaded portion located adjacent said first end;
    the flange has an annular shape and is connected to the tubular foot, above the threaded portion thereof;
    the widened portion of the metallic element has an annular shape and is connected to the second end of the tubular foot;
    the internal wall of the centrifuge cell includes an opening, and a nut is secured to said internal wall and extends across said opening; and
    the threaded portion of the metallic element is adapted to be inserted through the opening in said internal wall and threaded into engagement with said nut to hold the temperature sensor in place in the centrifuge cell.

3. A temperature sensor according to claim 1, wherein:
    the sensor further includes a polymeric material disposed inside the internal bore; and
    the temperature probe is imbedded in said polymeric material to hold the probe in thermal contact with the metallic element and to seal the probe from the exterior of the metallic element.

4. A temperature sensor according to claim 1, wherein the temperature probe is in direct contact with said widened portion of metallic element.

5. In a centrifuge cell of the type having an internal wall and a thermostatic control to control the temperature inside the cell, a temperature sensor for measuring the internal temperature of the centrifuge cell, the sensor comprising:
    a metallic element including
        (i) a flange fixed in intimate contact against an area of said internal wall of the cell, in direct heat transfer relation with said internal wall, and
        (ii) a widened portion spaced from said flange, including a lateral surface having a surface area significantly larger than the area of contact between the flange and the internal wall of the cell, and located inside the centrifuge cell in heat transfer relation with the atmosphere therein,
    the metallic element forming an internal bore; and
    a temperature responsive probe secured in said internal bore in heat transfer relation with the metallic element to sense, and to generate a signal indicative of, the temperature of metallic body.

6. A temperature sensor according to claim 5, wherein:
    the metallic element further includes a tubular foot having first and second ends and a threaded portion located adjacent said first end;

the flange has an annular shape and is connected to the tubular foot, above the threaded portion thereof;

the widened portion of the metallic element has an annular shape and is connected to the second end of the tubular foot;

the internal wall of the centrifuge cell includes an opening and a nut is secured to said internal wall and extends across said opening; and the metallic element extends through the opening in said internal wall, and the threaded portion of the metallic element is threaded into engagement with said nut to hold the temperature sensor in place in the centrifuge cell.

7. A temperature sensor according to claim 5, wherein:

the sensor further includes a polymeric material disposed inside the internal bore; and the temperature probe is imbedded in said polymeric material to hold the probe in thermal contact with the metallic element and to seal the probe from the exterior of the metallic element.

8. A temperature sensor according to claim 5, wherein the temperature probe is in direct contact with said widened portion of the metallic element.

* * * * *